United States Patent [19]

Brandelli

[11] 4,122,862
[45] Oct. 31, 1978

[54] EXTENDIBLE BALLCOCK

[76] Inventor: Anthony R. Brandelli, 2418 W. 256th St., Lomita, Calif. 90717

[21] Appl. No.: 676,375

[22] Filed: Apr. 12, 1976

[51] Int. Cl. .............................................. F16k 31/18
[52] U.S. Cl. ..................................... 137/437; 137/441; 137/451; 285/81; 285/89; 285/162; 285/343; 285/355; 285/356
[58] Field of Search ............... 137/434, 437, 441, 446, 137/451; 285/81, 82, 89, 248, 249, 250, 343, 355, 356, 158, 162; 251/42

[56] References Cited

U.S. PATENT DOCUMENTS

| | | | |
|---|---|---|---|
| 242,564 | 6/1881 | Sholder | 285/81 |
| 1,641,756 | 9/1927 | Haas | 137/437 |
| 2,385,156 | 9/1945 | Newell | 285/356 |
| 2,391,900 | 1/1946 | Hobbs | 285/356 |
| 2,745,428 | 5/1956 | Stone et al. | 137/446 |
| 2,752,938 | 7/1956 | Owens | 137/441 |
| 2,776,672 | 1/1957 | Faber | 137/437 |
| 2,827,073 | 3/1958 | Owens | 137/437 |
| 2,869,571 | 1/1959 | Price et al. | 137/451 |
| 2,989,071 | 6/1961 | Fulton et al. | 137/451 |
| 3,108,826 | 10/1963 | Black | 285/355 |
| 3,540,065 | 11/1970 | Gidner et al. | 285/355 |
| 3,556,132 | 1/1971 | Suffron et al. | 137/437 |
| 3,701,548 | 10/1972 | McGuire | 285/81 |
| 3,797,518 | 3/1974 | Holm et al. | 137/434 |

Primary Examiner—Martin P. Schwadron
Assistant Examiner—G. L. Walton
Attorney, Agent, or Firm—Fulwider, Patton, Rieber, Lee & Utecht

[57] ABSTRACT

An extendible ballcock assembly including a support pipe threaded at its lower end for partial receipt in a support fitting.

The support fitting furthermore includes a peripheral cavity in the upper end thereof adapted to receive a toroidal seal. The seal includes a threaded interior surface conformed to the support pipe threads and is compressed into the fitting by a compression nut. At the upper end the support pipe terminates in a valve assembly which includes antisiphoning provisions.

7 Claims, 5 Drawing Figures

EXTENDIBLE BALLCOCK

BACKGROUND OF THE INVENTION

1. Field of the Invention

The present invention relates to shut-off valves, and more particularly to a ballcock assembly adapted to be deployed at various heights.

2. Description of the Prior Art

Replacement of ballcocks is a servicing item most frequently done by a home user. For that reason, the chances of improper deployment or height adjustment are relatively great and various techniques have been utilized in the past to allow the Saturday mechanic some amount of post installation corrective adjustment. Most often it is the height of the ballcock that is improperly selected. Thus, there have been various devices developed in the past by which corrective height adjustments can be achieved after the initial installation is completed. Most frequently such adjustment is accommodated by way of a sliding insertion of a smooth tube through an O-ring seal compressed by a compression nut. Repeated adjustments of a device of this kind often leads to damage to the O-ring with the attendant leakage. Furthermore installations of this kind do not provide a strong structural interface supporting the heavy weight of the ballcock. Thus, there is the other alternative of selecting a ballcock of a particular size or vertical dimension, a selection process again often missed by the Saturday mechanic. Between these two alternatives there has been no satisfactory solution which provides both a rigid interface between the ballcock support pipe and the water pipe fitting which at the same time can be deployed at various heights.

SUMMARY OF THE INVENTION

Accordingly it is the general purpose and object of the present invention to provide a ballcock assembly which threadably engages both a seal and a mounting fixture.

Other objects of the invention are to provide a threaded water tight connection which effects a seal at various depths of threaded insertion.

Yet, further objects of the invention are to provide a ballcock support interface which concurrently effects a seal and a threaded engagement.

Briefly these and other objects are accomplished within the present invention by providing a ballcock assembly having a support pipe extending therefrom the free end of said support pipe being provided with a helical rounded male thread surface. A similarly shaped female thread surface is formed on the interior of the through fitting which is then conventionally installed into the inlet opening of a water closet. Formed in the upper end of the through fitting above the female threaded section is a cavity of elliptic section expanding to yet another threaded section adapted to receive a compression nut similarly provided with an elliptic interior. The cavities in the compression nut and the adjoining section in the fitting are conformed to receive an elliptically shaped elastomeric seal which includes an interior bore similarly conformed with a female thread pattern dimensioned to receive the male threads on the above described support pipe. Thus, the degree of advancement of the elastomeric seal onto the threads of the support pipe can be selected and the projecting threaded end beyond the seal provides a hard surface interface with the through fitting. Once the proper height adjustment is thus achieved, the compression nut can then be torqued down to the desired level of compression, effecting seal.

On the upper end, the ballcock assembly includes an annular chamber disposed around the periphery of the support pipe to enclose a diaphragm seal disposed over the free end thereof. More specifically a rubber diaphragm is aligned within a central cavity over the end of the support pipe and it is separated therefrom by a small gap by a standoff or spacer ring. The standoff ring furthermore provides the mounting provisions for an antisiphoning flapper seal and the upper surface of the annular cavity includes a central bore for telescopically receiving a plunger disposed between the end of the ballcock lever and the rubber diaphragm.

By way of this arrangement of parts selective adjustment of ballcock elevation can be achieved. Should, however, the valve be inadvertently left below the water level set by the ballcock float, reverse siphoning is precluded by antisiphoning provisions. Thus, the home user, or the so called saturday mechanic, can both achieve the desired height above any siphoning levels or, should he not achieve such height, inadvertent siphoning is avoided.

DESCRIPTION OF THE SPECIFIC EMBODIMENTS

Figure 1:
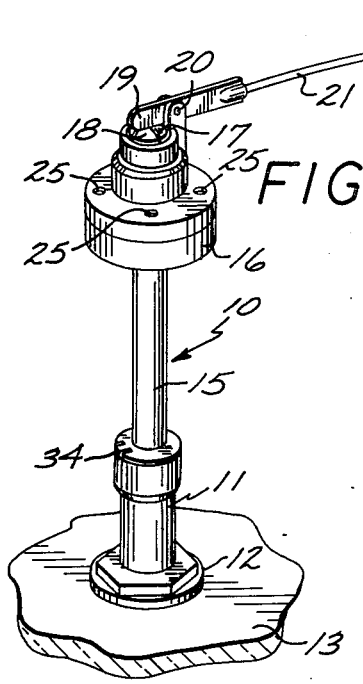
FIG. 1 is a perspective illustration of a ballcock assembly constructed according to the present invention, deployed for operation in a conventional water closet.

As shown in FIG. 1 the inventive ballcock assembly, generally designated by the numeral 10, comprises a lower mount 11 extending from a through fitting attached across a seal 12 to the bottom surface of a water closet enclosure 13 for connection with a water pipe (not shown). Extending axially upward from the lower mount 11, is a tubular support pipe 15 terminating at its upper end in a circular valve housing 16. Housing 16, according to means to be described, encloses a shutoff valve assembly and is therefore provided with a communicating bore 17 on its upper surface in which a follower 18 is slidably received. It is the articulation of this follower 18 within bore 17 that effects valve closure. To achieve valve closure at a predetermined water level within closet 13, the exposed end of follower 18 is aligned to oppose a projection 19 extending radially beyond a pivot 20 supporting a ballcock lever 21. A float 22 is conventionally attached to the free end of lever 21 and will thus rise with the rising level of water in the water closet. As the float so rises, the opposite projection progresses downwardly against the opposing surface of the follower 18, which, at a selected point of downward progression into bore 17, will effect a sealing closure within the valve housing 16. The valve housing 16 is illustrated as being defined by upper and lower engaging portions 16a and 16b.

As will be described hereinbelow, valve assembly 16 can be selectively deployed at any desired level by selective insertion of pipe 15 into the lower mount 11. Should the water level within the water closet 13 inadvertently reach the valve housing, back flow into the water system is precluded by a plurality of antisiphoning openings 25 in conjunction with apparatus to be described.

Figure 2:
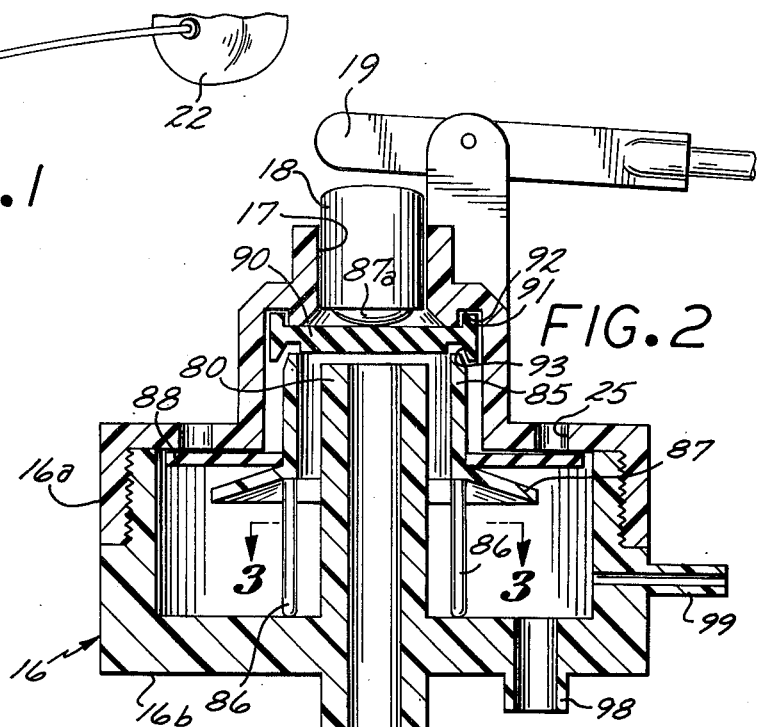
FIG. 2 is a side view, taken in section, of one embodiment of the ballcock assembly shown in FIG. 1.

As shown in more detail in FIG. 2, the lower mount 11 comprises a tubular section 31 extending axially from the bottom through fitting and terminating at the upper end in an enlarged segment 32 including an interiorly threaded cavity 33 in its inlet. Cavity 33, on its lower end, communicates with a reduced diameter sealing chamber 35, shaped along an elliptical section to provide a tapered sealing surface. Chamber 35, in turn, communicates on its lower end with helically threaded female surface 36 extending downwardly into the interior of the tubular section 31.

A compression nut 40, conformed to extend into the interior of the threaded cavity 33, includes yet another matching elliptical chamber 41 forming a mating upper half of the previously described chamber 35. Received within the common interior of chambers 41 and 35 is an elastomeric toroidal seal 45 having a exterior surface 46 shaped in the manner of a longitudinal section of an elliptical body of revolution for receipt within the chambers 35 and 41 and an interior surface 47 again helically threaded to conform with surface 36. The lower end of the support pipe 15 is provided with an exterior helical threaded section 50 and thus can be mated with the interior surfaces 47 and 36.

More specifically, in order to achieve a sealing interface the threaded section 50 and surfaces 36 and 47 are shaped to a mating helical pattern, both the high and the low points in the helix being rounded to eliminate sharp edges. This rounding of mating surfaces results in a smooth thread engagement pattern minimizing any wear in the seal as result of adjustment.

Figure 4:
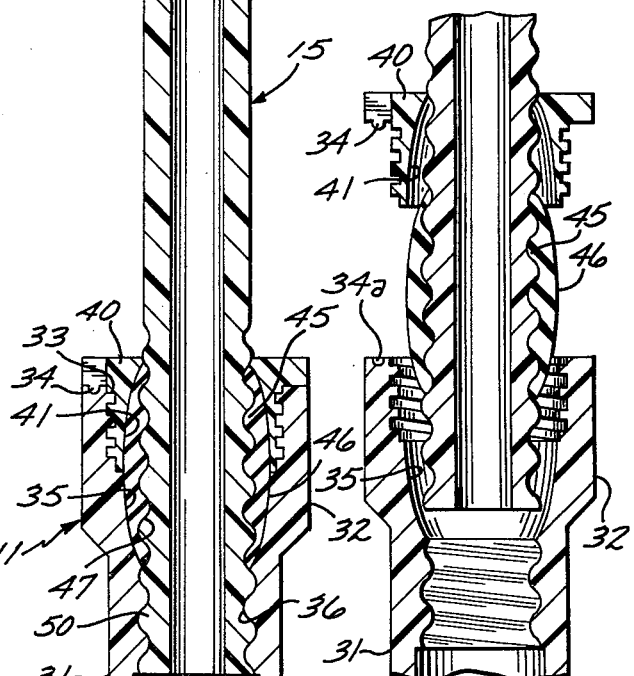
FIG. 4 is a sectional view, in parts, of adjustable seal assembly useful with the present invention.

By reference to FIGS. 2 and 4, this sealing arrangement allows for various levels of insertion of the threaded end section 50 into the interior of the lower mount 11. Any desired level of insertion can thus be achieved by running up the elastomeric seal 45 to the desired level on the threaded section 50, threading the exposed end of the support pipe 15 into the interior of the lower support 11, and then compressing the seal by the compression nut 40, which includes a snap lock 34 at the upper end, which mates with indentation 34 A at upper end of enlarged segment 32.

At the upper end, support pipe 15 extends into the interior of the circular valve housing 16 to form an upwardly directed valve seat extension 80 therein. An annular spacer 85 is disposed about extension 80 and is supported to a determined height in this surrounding relationship by a plurality of vertical support members 86. In this configuration the upper edge of spacer 85 extends beyond the upper opening in extension 80. Extension 80, in turn, is aligned in axial alignment below the bore 17 and the sliding articulation of follower 18 is therefore directly against this end opening. In order to effect a seal at the downward limit of the follower stroke the lower end of the follower is formed to provide a hemispherical projection 87a which compresses a rubber diaphragm seal 90 interspaced between the upper opening in extension 80 and the adjacently opposite interior end of bore 17. Seal 90 furthermore includes a peripheral ridge 91 formed on the upper surface thereof aligned for receipt in a circular groove 92 formed around the interior end of bore 17. It is this relationship of ridge 91 and groove 92 that maintains the seal in alignment relative both the follower 18 and the extension 80. On the lower surface, seal 90 is similarly provided with a tapered concentric groove 93 aligned to receive the upper edge of spacer 85 extending beyond the end of extension 80.

Spacer 85 furthermore includes, at the juncture with the support legs 86, conically expanding in the downward direction support ring 87 which supports from below an elastic sealing ring 88 surrounding the spacer. Sealing ring 88 is dimensioned to extend below the ports 25, covering such ports when the internal pressure in housing 16 is greater than the external pressure.

At the completion of a filling cycle, the diaphragm seal 90 is brought down against the end of extension 80 by the downward progression of the pivoted projection 19. Should the water system pressure fall below the water head for any reason, the downward forces on ring 88 will force the ring 88 downwards allowing seal 90 to rest on the end of extension 80 and, through this pressure differential to achieve sealing.

Figure 3:
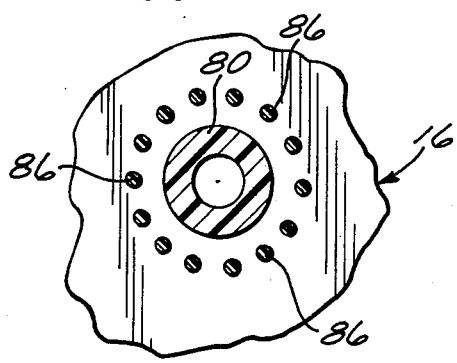
FIG. 3 is a sectional end view taken along line 3—3 of FIG. 2.

In addition to these structural details, valve housing 16 furthermore includes a conventional fill outlet 98 and a refill outlet 99 providing the normal functions of a ballcock valve. These functions are achieved by the above described diaphragm valve 90 operation which when released will allow the supply water to flow out the end of extension 80 and between the support legs 86. As shown in FIG. 3, the disposition of legs 86 around extension 80 provides wide increments of separation, thus presenting very little flow restriction thereacross.

Figure 5:
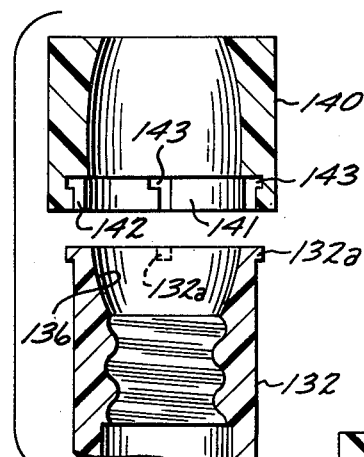
FIG. 5 is yet another sectional view illustrating an alternative embodiment of the adjustable seal assembly.

By reference to FIG. 5 an alternative configuration of the interface between compression nut 40 and mount 11 can be utilized for the purposes herein. In this illustration like numbers are utilized to identify like functional elements and the compression nut 40 therefore similarly includes the upper seal receiving chamber 41 which at its lower end terminates in an enlarged end cavity 141 conformed to receive the upper end of the enlarged segment 132 with its associated complementary chamber 136. To facilitate a securing connection, segment 132 furthermore includes a plurality of projecting elements 132a disposed at equal increments of arc around the upper periphery of the segment. These same elements are receivable in a corresponding plurality of longitudinal grooves 142 distributed over the interior of cavity 141. Each groove 142, at its upper or interior end, terminates in a corresponding arcuate transverse slot 143 joining such grooves in the platform of an "L" to provide a retaining seat for the element 132a. This configuration permits repeated reconnections of the compression nut 140 with minimum wear to the seal surfaces.

Some of the many advantages of the present invention should now be readily apparent. The invention provides a convenient sealing interface which will tolerate extensive adjustment in a device which also protects the house water system in the event of initial misadjustment.

Obviously many modifications and variations to the above disclosure can be made without departing from the spirit of the invention. It is therefore intended that the scope of the invention be determined solely dependent on the claims hereto.

I claim:

1. A pressure sealing assembly of a pipe extendibly received in a through fitting comprising, in combination:

a pipe having a helically threaded peripheral segment proximate the lower end thereof, the thread contour of said peripheral segment being rounded on both the high and low extremities thereof;

an annular elastomeric seal having an exterior surface shaped in the manner of a longitudinal segment of an elliptic body of revolution and a substantially concentric interior surface conformed to receive a section of said peripheral segment on said pipe;

a through fitting having a first interior cavity proximate the upper end thereof conformed to partly receive the exterior surface of said seal, a second interior cavity extending axially from said first interior cavity into the interior of said fitting, said second cavity having an interior peripheral surface conformed to the thread contour of said peripheral segment and receiving said segment of said pipe; and compression means securable to said upper end of said fitting and including a third interior cavity conformed to partly receive the exterior surface of said seal for compressing said seal therebetween.

2. The pressure sealing assembly of claim 1 wherein: said through fitting includes an enlarged diameter bore communicating immediately beneath said second cavity.

3. The pressure sealing assembly of claim 2 wherein: said compression means is securable by threaded engagement to said fitting and includes a snap lock.

4. The pressure sealing assembly of claim 2 wherein: said compression means is securable by interlocking key members to said fitting.

5. The pressure sealing assemby of claim 1 further comprising:

valve means supported on said pipe and adapted to be articulated when the water level in a water closet reaches a predetermined level relative thereto; and means to mount said through fitting to the bottom surface of said water closet.

6. The pressure sealing assembly of claim 5 wherein: said valve means includes a cylindrical housing surrounding the upper end of said pipe, a rubber diaphragm disposed in said housing in alignment over said pipe, an annular spacer ring surrounding said pipe and disposed within said housing to extend beyond the end of said pipe to maintain said diaphragm at a predetermined separation relative to said pipe, and ballcock means pivotally mounted to said housing for compressing said diaphragm against said pipe at a predetermined level of water in said closet.

7. The pressure sealing assembly of claim 6 further comprising:

annular disc sealing means disposed within said housing around said pipe in subjacent alignment relative a plurality of openings in said housing.

* * * * *